United States Patent [19]

Oono et al.

[11] Patent Number: 5,004,078
[45] Date of Patent: Apr. 2, 1991

[54] VENTILATED DISK AND PROCESS FOR MAKING SAME

[75] Inventors: Toshio Oono; Hiroki Uemura, both of Aichi, Japan

[73] Assignee: Aisin Takaoka Co., Ltd., Toyota, Japan

[21] Appl. No.: 422,896

[22] Filed: Oct. 18, 1989

[30] Foreign Application Priority Data

Nov. 9, 1988 [JP] Japan .......................... 63-146219[U]
Nov. 9, 1988 [JP] Japan .......................... 63-146220[U]
Nov. 9, 1988 [JP] Japan .......................... 63-146221[U]

[51] Int. Cl.$^5$ ..................... F16D 65/12; F16F 15/14
[52] U.S. Cl. ..................... 188/218 A; 74/574; 188/378
[58] Field of Search ............ 188/218 A, 218 XL, 378, 188/379; 74/574

[56] References Cited

U.S. PATENT DOCUMENTS

| 2,764,260 | 9/1956 | Fleischman | 188/218 A |
|---|---|---|---|
| 3,286,799 | 11/1966 | Shilton | 188/218 A X |
| 3,292,746 | 12/1966 | Robinette | 188/218 A |

FOREIGN PATENT DOCUMENTS

| 1-126434 | 8/1989 | Japan . | |
|---|---|---|---|
| 1395908 | 5/1975 | United Kingdom | 188/218 A |

Primary Examiner—Duane A. Reger
Attorney, Agent, or Firm—Burns, Doane, Swecker & Mathis

[57] ABSTRACT

A ventilated disk used in automobiles and industrial vehicles includes a pair of mutually opposing disk portions, a plurality of radially extending ribs integrally formed with the disk portions and interposed therebetween, and at least one annular damping member. Formed in each rib is at least one radially extending oblong hole which passes through the rib in the circumferential direction. The oblong holes in the respective ribs form at least one circular array along a circular whose center is the center of the disk. The annular damping member(s) extends/extend through the oblong holes forming the annular array(s) and is in contacting engagement with the outer end portion and side portion of each ablong hole.

16 Claims, 7 Drawing Sheets

VENTILATED DISK AND PROCESS FOR MAKING SAME

FIELD OF THE INVENTION

This invention relates to a disk rotor in a brake apparatus for automotive vehicles. More particularly, the invention relates to a ventilated disk used in automobiles and industrial vehicles and adapted to prevent whining at the time of braking.

BACKGROUND

Figure 1:
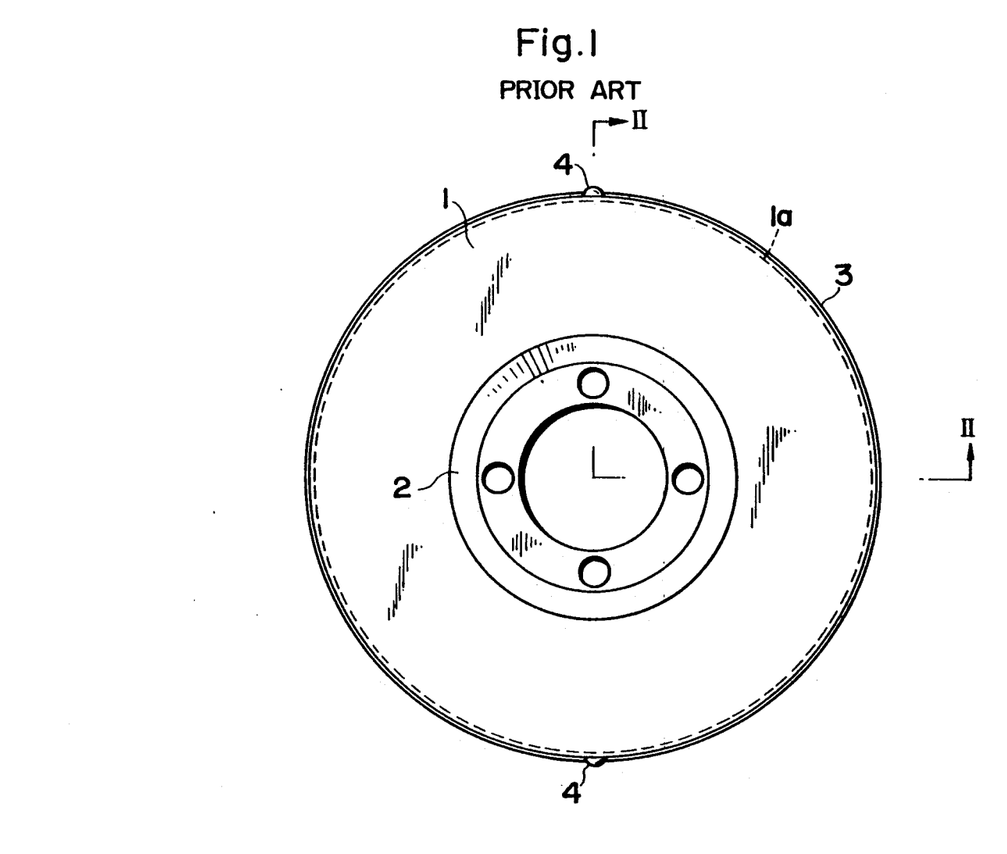
FIG. 1 is a front view showing an example of the prior art.
Figure 2:
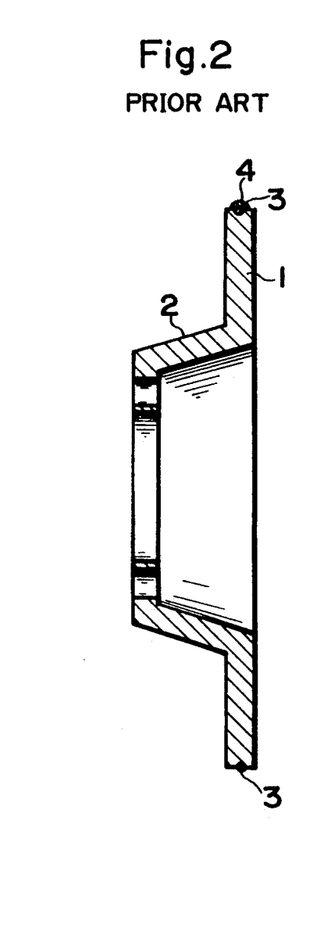
FIG. 2 is a side section taken along line II—II of FIG. 1.

An example of a disk rotor of this type is disclosed in the specification of Japanese Utility Model Laid-Open (KOKAI) No. 54-52576. As shown in FIGS. 1 and 2, the disk rotor has a disk portion 1 and a columnar hat portion 2 formed integral with the disk portion 1. An annular groove 1a is formed along the entire circumferential surface of the disk portion 1, and a metal wire 3 is wound on the disk portion 1 so as to engage the annular groove 1a. The metal wire 3 is fixed to the circumferential surface of the disk portion 1 by welding 4 at one or more points.

However, a problem encountered in the prior-art disk rotor is that unwelded portions of the metal wire 3 lift up from the circumferential surface of the disk portion 1 for such reasons as a difference in coefficient of thermal expansion between the disk portion 1 and the metal wire 3, as a result of which vibration of the disk rotor produced at braking cannot be completely absorbed.

SUMMARY OF THE DISCLOSURE

It is an object of the present invention to solve the aforementioned problem, i.e., to provide a ventilated disk capable of rapidly damping disk rotor vibration produced at the time of braking.

Another object of the invention is to provide a ventilated disk in which the vibration damping function is not affected by the state in which a damping member is installed.

A further object of the invention is to provide a ventilated disk in which an outstanding cooling effect is further obtained for cooling the damping member.

According to a first aspect of the present invention, the foregoing objects are attained by providing a ventilated disk which includes a pair of mutually opposing disk portions, a plurality of substantially extending ribs integrally formed with the disk portions and interposed therebetween, and at least one annular damping member, in which:

formed in a plurality of ribs is at least one radially extending oblong hole which passes through the rib in the circumferential direction;

the oblong holes in the respective ribs form at least one circular array along a circle whose center is the center of the disk portions; and the annular damping member extends through the oblong holes forming the circular array and is in contacting engagement with the outer end portion and side portion of each oblong hole.

In another aspect of the invention, the foregoing objects are attained by providing a ventilated disk which includes a pair of mutually opposing disk portions, a plurality of substantially radially extending ribs integrally formed with the disk portions and interposed therebetween, and two annular damping members, in which:

formed in a plurality of ribs is a radially extending oblong hole which passes through the rib in the circumferential direction, the oblong holes in the respective ribs forming at least one circular array along a circle whose center is the center of the disk portions;

the plurality of oblong holes defining the circular array comprise oblong holes of a first class formed in respective ones of any plurality of the ribs, and oblong holes of a second class longer in the radial direction than the first class oblong holes, with the outer end portions of the second class oblong holes being situated at positions radially outward of the outer end portions of the first class oblong holes; and the annular damping member extends through the first and second class oblong holes defining the circular array and is in contacting engagement with the outer end portion and side portion of the first class oblong holes and the side portion of the second class oblong holes.

According to a third aspect of the present invention, there is provided a ventilated disk comprising:

a disk;

a plurality of substantially radially extending ribs formed integral with said disk;

a plurality of holes disposed in said disk in at least one circular array; and at least one annular damping member extending through the circular array of said holes in contacting engagement with said hole but leaving a space for vibration in the holes.

According to a fourth aspect of the present invention, there is provided a process for producing a ventilated disk comprising:

providing a mold with a cavity for casting a ventilated disk having a pair of disk portions, a plurality of ribs extending substantially in a radial direction within the disk portions, and a plurality of holes provided in the ribs;

setting within a mold at least one annular damping member so as to extend through said holes leaving, in a cast state, a space for vibration within the holes while maintaining contact between an inner wall of the holes and the annular damping member; and pouring a molten metal into the mold cavity to cast said ventilated disk.

With the ventilated disks described above, vibration produced by the disk portions is absorbed and rapidly damped by the annular damping member, which has a different characteristic frequency. As a result, whining, which is produced by self-excited vibration of the braking pads resonating with the disk portions, is prevented.

The damping members which absorbs the vibration of the disk portions is passed through circumferentially aligned holes formed in the ribs interposed between the disk portions, and is mounted in a state intimately contacting the outer end portion and side portion of each oblong hole. As a result, the damping function of the ventilated disk is little affected by any variance in the mounted state of the damping member. This reduces the occurrence of irregularities in product quality.

Further, since the damping member is disposed in the ventilating passages defined between the disk portions by the plurality of ribs, cooling is performed by air blown out through the interior of the ventilating passages from the center of the disk toward the periphery thereof due to rotation of the disk. This eliminates the danger of the disk portions and damping member separating from each other owing to a difference in thermal expansion between the disk portions and the damping member. This in turn eliminates any loss in damping effect.

Thus, in accordance with the ventilated disk of the present invention, vibration produced by sliding motion between the disk and the brake pads can be damped rapidly and steadily by the action of the damping member, whining produced at braking is prevented, and the damping function is not influenced by the mounted state of the damping member or by heat produced at braking. This makes it possible to obtain a stable braking effect.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 3:
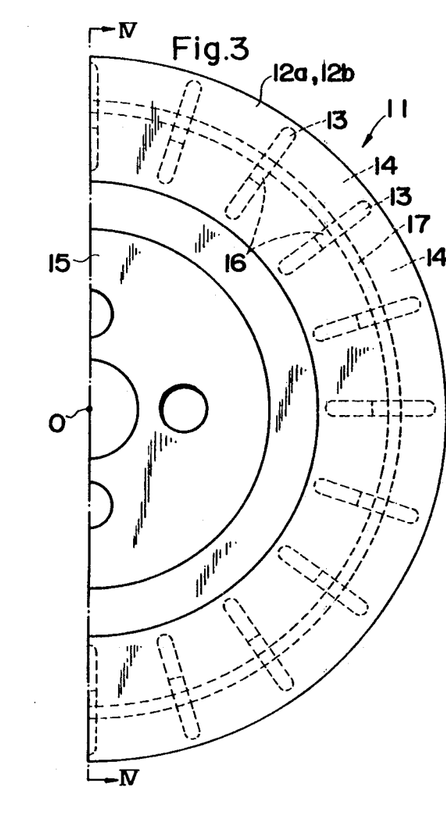
FIG. 3 is a right-half front view showing a first embodiment of the present invention.
Figure 4:
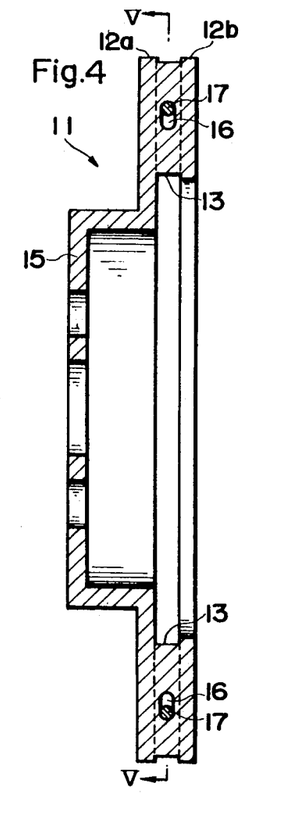
FIG. 4 is a side section taken along line IV—IV of FIG. 3.
Figure 5:
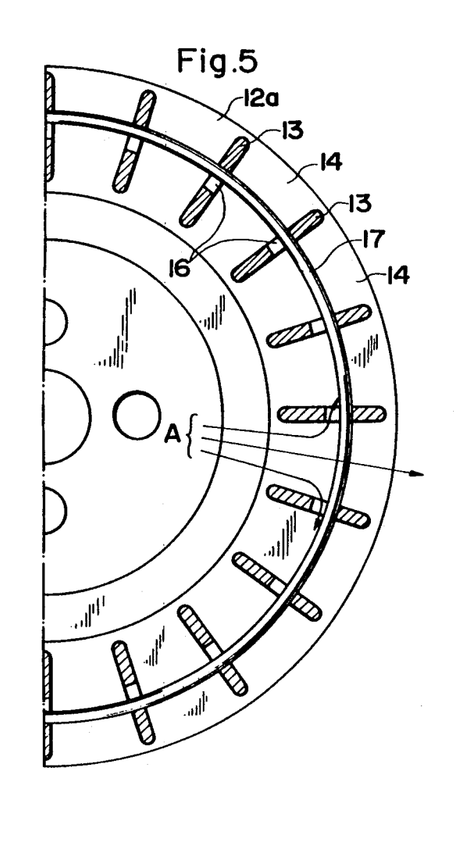
FIG. 5 is a sectional view taken along line V—V of FIG. 4.

FIGS. 3 through 5 illustrate a first embodiment of a ventilated disk according to the present invention. The disk, shown at numeral 11, includes a pair of mutually opposing disk portions 12a, 12b between which are interposed a plurality of radially extending ribs 13 integrally molded with the two disk portions 12a, 12b. Ventilating passages 14 open to the inner and outer circumferential sides of the disk 11 are formed between the pair of disk portions 12a, 12b by the ribs 13. A columnar hat portion 15 which forms a hub is integrally molded with one of the disk portions, namely the disk portion 12a.

Each rib 13 is formed to have an oblong hole 16 penetrating the rib 13 circumferentially and having its major axis extending radially of the disk 11. The oblong holes 16 are arrayed along the circumference of a single circle whose center is the center O of the disk 11. The oblong holes 16 thus form a single circular array.

An annular damping member 17 fabricated by bending a bar having a circular cross section is incorporated (or imbeded) in the disk 11 so as to pass through the circularly arrayed oblong holes 16 of the ribs 13. The damping member 17 is in intimate contacting engagement with the inner walls of the outer end and side portions of each oblong hole 16.

Figures 18, 19:
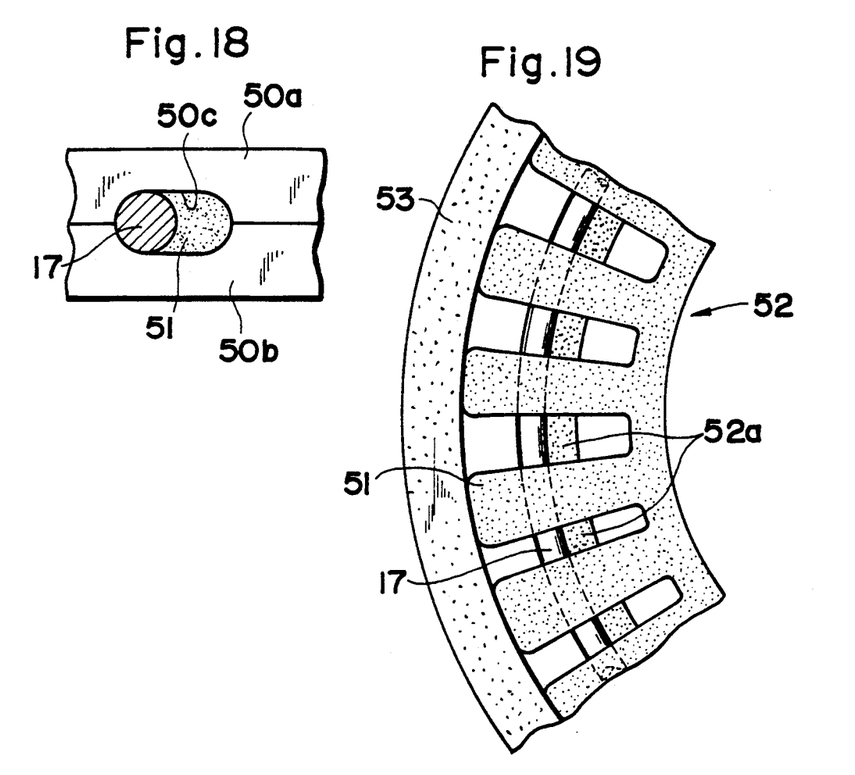
FIG. 18 is an explanatory view illustrating a process for casting the disk of the present invention.
FIG. 19 is a partial plan view showing a core for casting the disk of FIG. 3.
Figure 20:
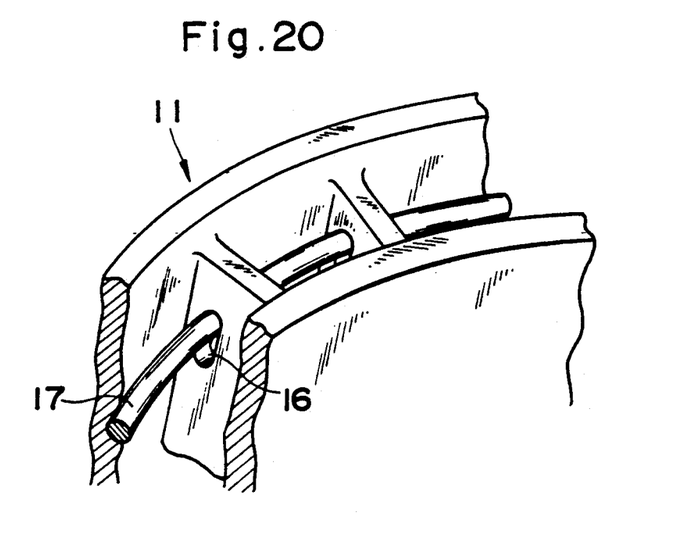
FIG. 20 is a partial perspective view showing the disk cast by the core of FIG. 19.

The annular damping member 17 is installed in the oblong holes 16 by internal chilling in a manner which will now be described. Specifically, as shown in FIG. 18, a core for casting is fabricated. This is done by previously setting the annular damping member 17 in a portion 50c, which is for forming one oblong hole 16, between an upper pattern 50a and a lower pattern 50b, and then blowing in a core sand 51 to mold a core 52 of the kind shown in FIG. 19. Numeral 53 in FIG. 19 denotes a core print. When the core sand 51 is blown in, the sand is also blown into the gap between the damping member 17 and the inner wall portion of the oblong hole-forming portion 50c of the upper and lower patterns 50a, 50b (see FIG. 18). In this way, a core portion 52a for forming the oblong hole 16 is molded, as shown in FIG. 19. The core 52 fabricated by the foregoing process is set in a mold (master mold), molten metal is poured (cast) into the mold, and after mold has been removed, the core sand 51 is removed and made to fall out by shot. Thus is cast the disk incorporating the damping member 17, as shown in FIG. 20. By applying a weld-preventing agent to the damping member 17 to form a film thereon beforehand, the damping member 17 will not become affixed to the main body of the disk 11 when the molten metal is poured into the mold. Since the region of cast molten metal contacting the surface of the damping member 17 solidifies rapidly when the molten metal is introduced, it is possible for adhesion of the damping member 17 to be prevented even if no weld-preventing agent is applied.

Examples of the weld-preventing agent are silicone oil or solutions obtained by dissolving the following in water-glass: silicon powder, silicon oxide powder, graphite, pine black, mica flour, aluminum powder, talcum powder, etc. It is also possible to use a mold-coating material or mold-removing agent. An example of the material forming the main body of the disk 11 is gray cast iron, and examples of materials forming the damping member 17 are stainless steel (SUS), steel (SS) and sintered materials.

The damping member 17 is then retained in each rib 13 in intimate contact with the inner walls at the outer end and side portions of each oblong hole 16. However, since the damping member 17 is not welded to the inner walls of the oblong hole 16, a minute gap on the order of micron units is formed between the damping member 17 and the inner wall of the oblong hole 16. Further, since the oblong hole 16 has its major axis oriented in the radial direction, a constant clearance is formed between the damping member 17 and the inner wall of the radially inner end of the oblong hole 16.

The ventilated disk is so designed that vibration of the disk portions 12a, 12b caused when braking pads (not shown) are urged against the outer side surfaces of the disk portions 12a, 12b is quickly damped by the friction damping action of the damping member 17 in the minute gap between the damping member 17 and the inner wall of the oblong hole 16, namely by the action of the damping member 17, which disturbs the resonant points of the disk portions 12a, 12b and lowers the resonance level. More specifically, at the time of disk rotor vibration, the damping member 17 and the disk portions 12a, 12b repeatedly undergo minute relative vibration against the frictional force thereof, so that the vibrational energy is converted into thermal energy. As a result, the vibration of the disk portions 12a, 12b is damped and the occurrence of whining is mitigated.

With rotation of the disk 11, air passes through the ventilating passages 14 from the inner to the outer circumferential sides of the disk 11, as shown by the arrow A in FIG. 5, and the air passes through the oblong holes 16 as well. As a consequence, the disk portions 12a, 12b and the damping member 17 are cooled together. Therefore, the damping member 17 will not undergo thermal expansion and unite with the inner wall of the oblong hole 16 due to frictional heat produced owing to friction between the disk 11 and the braking pads. This means that there is no deterioration in the damping function.

Figure 6:
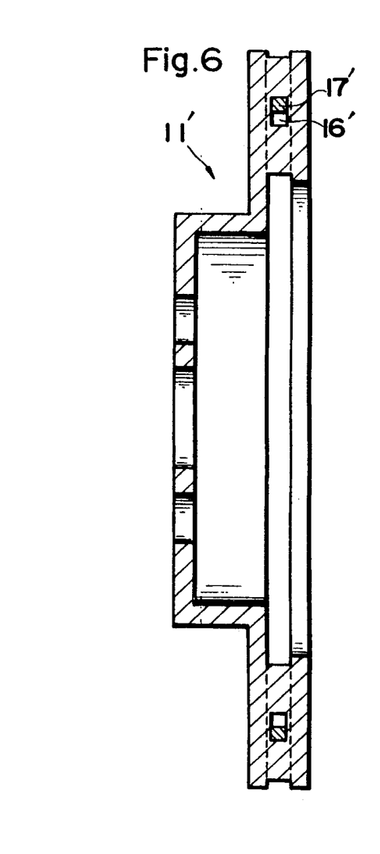
FIG. 6 is a side section showing a modification of the embodiment of FIG. 3.

FIG. 6 illustrates a modification of the embodiment of FIGS. 3 through 5. Whereas the oblong hole 16 of the foregoing embodiment is elliptical, an oblong hole 16' in this modification is rectangular, with the major axis thereof being oriented in the radial direction of disk 11'. Another difference is that the damping member, shown at numeral 17', is formed by bending a member having a rectangular cross section. The disk 11' also exhibits a damping function by virtue of the damping member 17', just as is the above-described embodiment.

Figure 7:
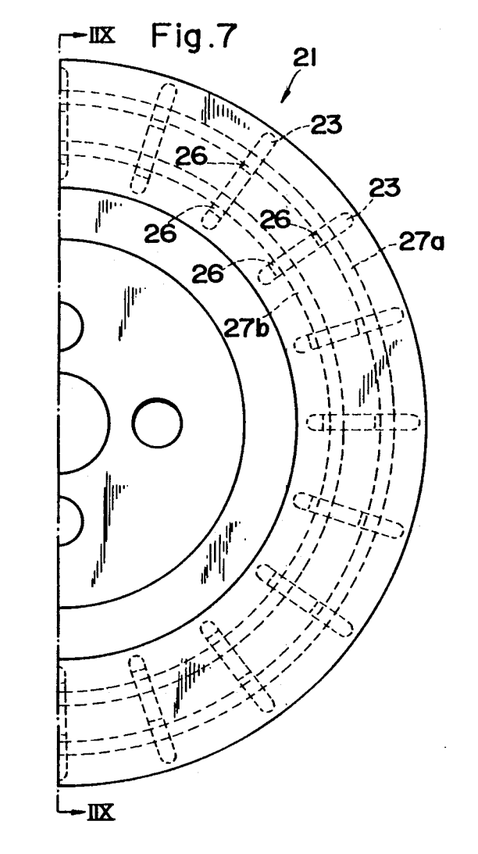
FIG. 7 is a right-half front view showing a second embodiment of the present invention.
Figure 8:
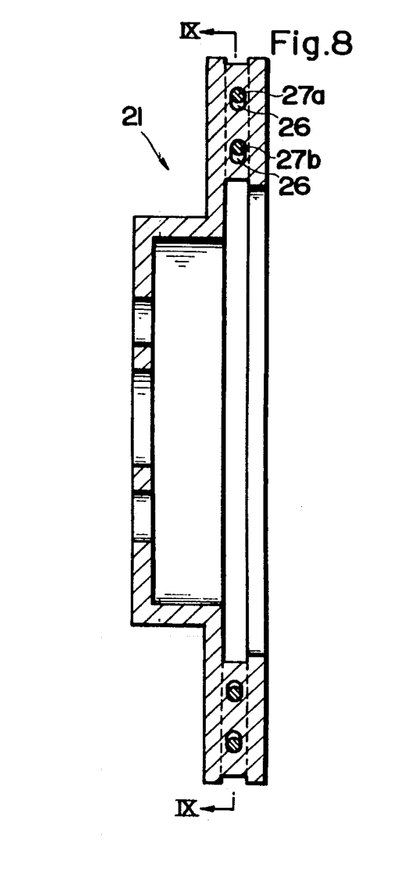
FIG. 8 is a side section taken along line VIII—VIII of FIG. 7.
Figure 9:
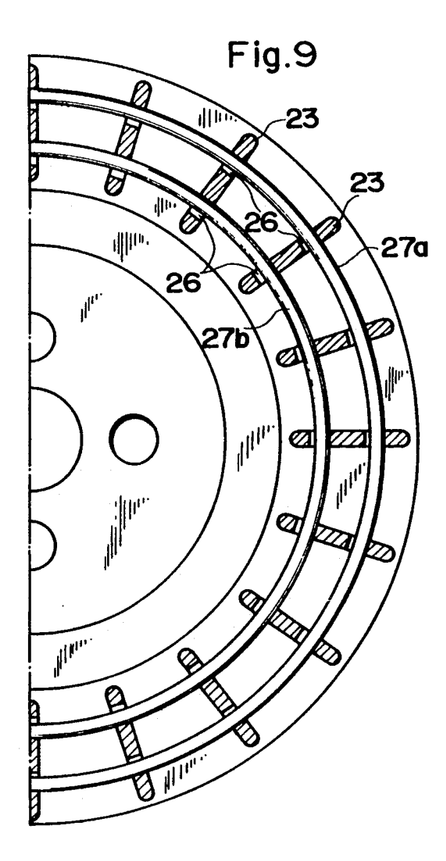
FIG. 9 is a sectional view taken along line IX—IX of FIG. 8.

FIGS. 7 through 9 illustrate a second embodiment of a ventilated disk according to the present invention. In this embodiment, each rib, shown at numeral 23, is formed to have two oblong holes 26, 26 along the radial direction of the disk 21, thereby forming two circular arrays of the oblong holes 26. The holes 26 are elliptical (or rectangular) in shape, as are the oblong holes 16 of the first embodiment shown in FIGS. 3 through 5. Annular damping members 27a, 27b having different diameters are incorporated in the disk by being passed through the two circular arrays of oblong holes 26, 26.

The method of incorporating the damping members 27a, 27b and the state of engagement between the damping members 27a, 27b and the oblong holes 26, 26 are the same as in the embodiment of FIGS. 3 through 5. The damping members 27a, 27b provide a damping effect similar to that described above.

Figure 10:
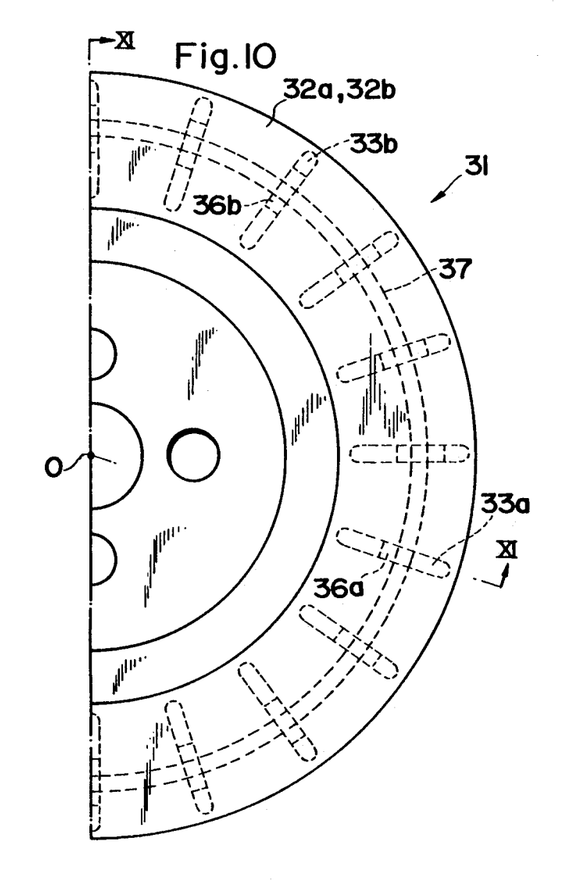
FIG. 10 is a right-half front view showing a third embodiment of the present invention.
Figure 11:
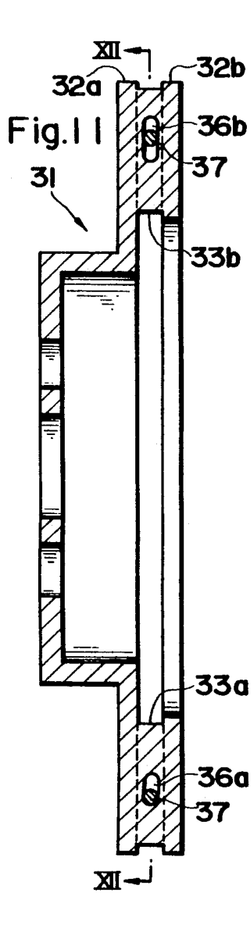
FIG. 11 is a side section taken along line XI—XI of FIG. 10.
Figure 12:
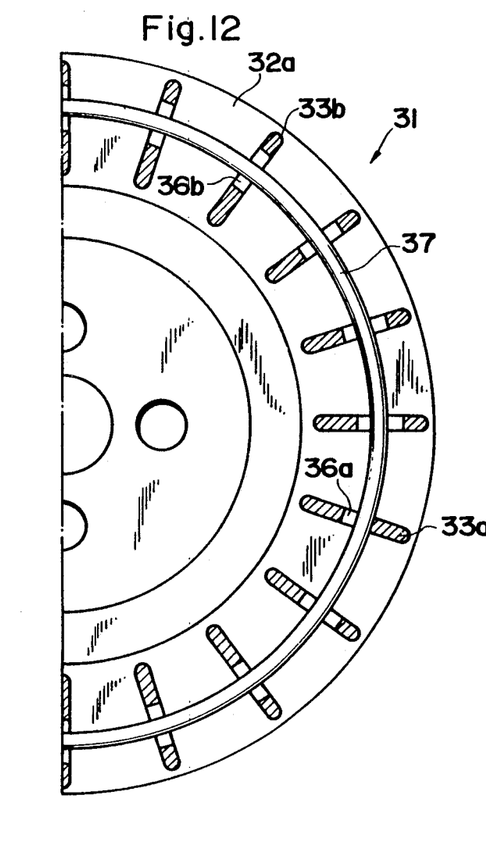
FIG. 12 is a sectional view taken along line XII—XII of FIG. 11.

FIGS. 10 through 12 depict a third embodiment of a ventilated disk according to the present invention. In this embodiment, a plurality of ribs are interposed between a pair of disk portions 32a, 32b, first class oblong holes 36a are formed in any number of these ribs (a pair of ribs, which are situated at positions symmetrical with respect to the center O of the disk 31, as shown in the illustration), shown at numeral 33a, and second class oblong holes 36b, which are longer in the radial direction than the first class oblong holes 36a, are formed in the remaining ribs, shown at numeral 33b. The first and second class oblong holes 36a, 36b define a single circular array. A single damping member 37 is incorporated in the disk 31 by being passed through the first and second class oblong holes 36a, 36b defining the circle.

Owing to the difference in length between the first class oblong holes 36a and second class oblong holes 36b, the damping member 37 is in contacting engagement with the inner wall of the first class oblong hole 36a at both its outer end and side portion, but is in contacting engagement with the inner wall of the second class oblong hole 36b at only its side portion.

The method of incorporating the damping member 37 in this embodiment is the same as in the embodiment of FIGS. 3 through 5. The damping member 37 provides a similar damping effect.

Figure 13:
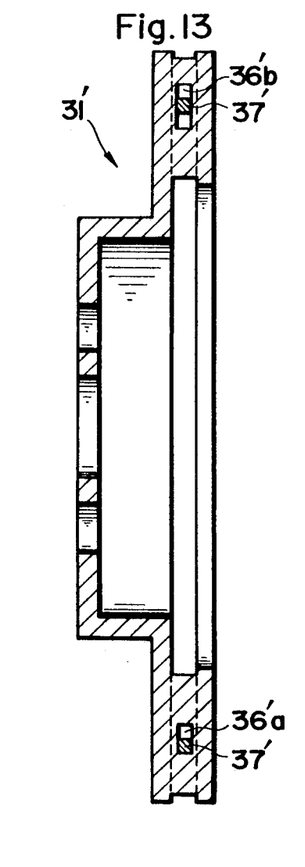
FIG. 13 is a side section showing a modification of the embodiment of FIG. 10.

FIG. 13 illustrates a modification of the third embodiment shown in FIGS. 10 through 12. Whereas the first and second class oblong holes 36a, 36b of the third embodiment are elliptical, first and second class oblong holes 36'a, 36'b in this modification are rectangular in cross section, with the major axes thereof being oriented in the radial direction of the disk 31'. Another difference is that the damping member, shown at numeral 37', is formed by bending a member having a rectangular cross section. The disk 31' also exhibits a damping function by virtue of the damping member 37', just as in the foregoing embodiment.

Figure 14:
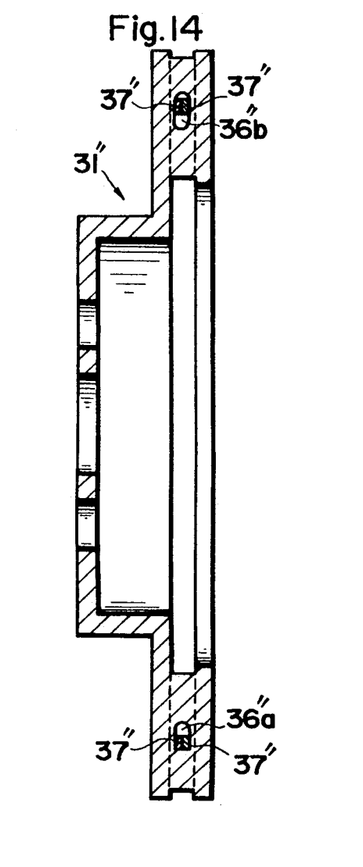
FIG. 14 is a side section showing another modification of the embodiment of FIG. 10.

FIG. 14 depicts a further modification of the third embodiment shown in FIGS. 10 through 12. This modification differs from the foregoing in the shape of the first class oblong hole 36"a, and in that a pair of damping member 37", each obtained by bending a member having a rectangular cross section, are incorporated in the disk, shown at numeral 31", by being passed through the first class oblong holes 36"a and second class oblong holes 36"b. By virtue of the pair of damping members 37", 37", this disk 31" also exhibits a damping function, just as in the foregoing embodiment.

Figure 15:
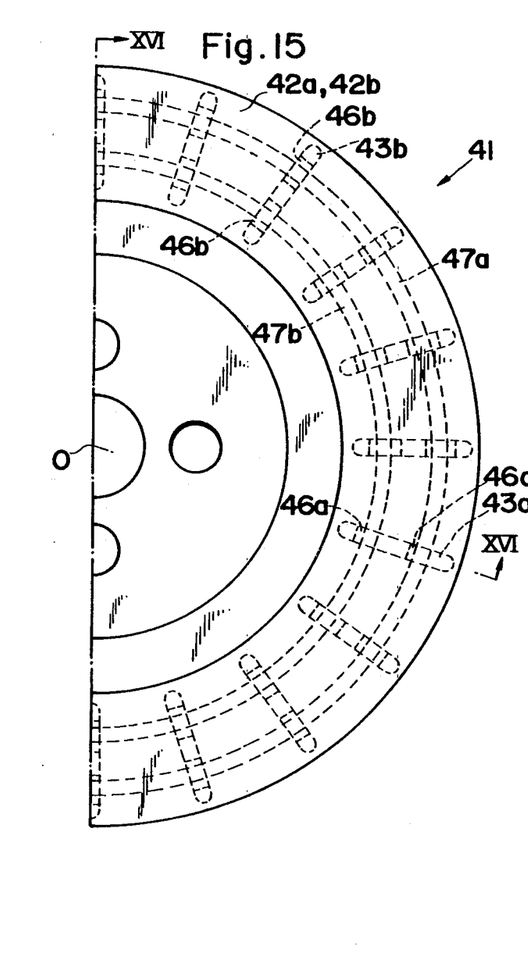
FIG. 15 is a right-half front view showing a fourth embodiment of the present invention.
Figure 16:
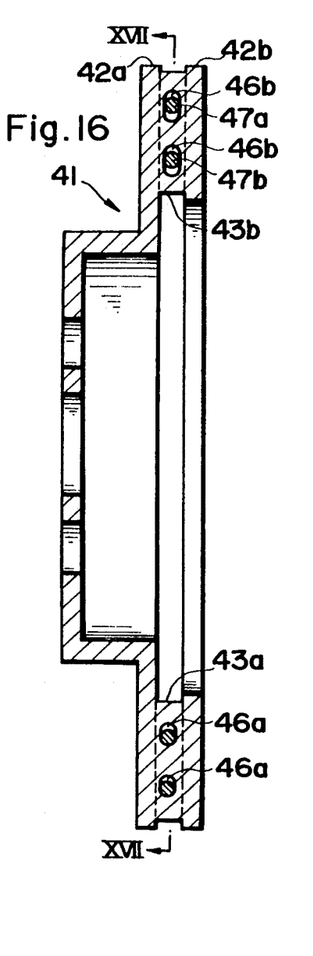
FIG. 16 is a side section taken along line XVI—XVI of FIG. 15.
Figure 17:
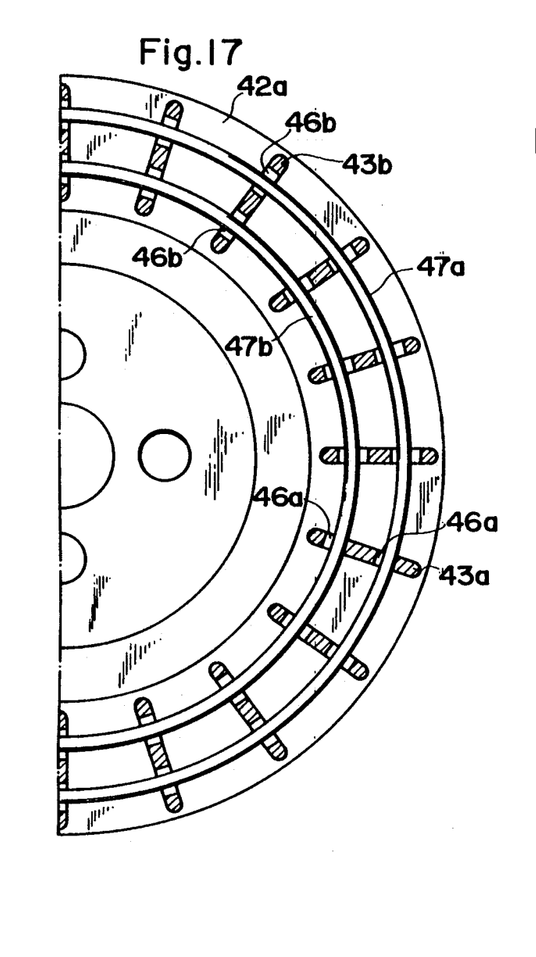
FIG. 17 is a sectional view taken along line XVII—XVII of FIG. 16.

FIGS. 15–17 illustrate a fourth embodiment of a ventilated disk according to the present invention. In this embodiment, a plurality of ribs are interposed between a pair of disk portions 42a, 42b, two first class oblong holes 46a are formed in any number of the these ribs (a pair of ribs which are situated at positions symmetrical with respect to the center O of the disk 41, as shown in the illustration), shown at numeral 43a, in the radial direction of the disk 41, and two second class oblong holes 46b, which are larger in the radial direction than the first class oblong holes 46a, are formed in the remaining ribs, shown at numeral 43b, in the radial direction of the disk 41. The first and second class oblong holes 46a, 46b define two circular arrays, respectively. Annular damping members 47a, 47b having different diameters are incorporated in the disk 41 by penetrating through the first and second class oblong holes 46a, 46b defining the two circular arrays.

Owing to the difference in length between the first class oblong holes 46a and second class oblong holes 46b, the damping members 47a, 47b are in contacting engagement with the inner walls of the first class oblong holes 46a at both their outer ends and side portions, but are in contacting engagement with the inner walls of the second class oblong holes 46b at only their side portions.

The method of incorporating the damping members 47a, 47b in this embodiment is the same as in the embodiment of FIGS. 3 through 5. The damping members 47a, 47b provide a damping effect similar to that described above.

Throughout the embodiments the ribs may extend substantially in a radial direction, i.e., a spiral direction, a direction intersecting the radius of the disk or the like extending arrangement are allowable.

As many apparently widely different embodiments of the present invention can be made without departing from the spirit and scope thereof, it is to be understood that the invention is not limited to the specific embodiments thereof except as defined in the appended claims.

What is claimed is:

1. A ventilated disk comprising:
   a pair of mutually opposing disk portions;
   a plurality of substantially radially extending ribs formed integral with said disk portions and interposed therebetween;
   a plurality of said ribs being formed to have at least one radially extending oblong hole penetrating the rib in a circumferential direction, said oblong holes defining at least one circular array along a circle whose center is the center of said disk portions; and
   at least one annular damping member extending throughout said oblong holes defining the said at least one circular array, said annular damping member being in intimate engagement with an outer end portion and side portions of each of said oblong holes.

2. A ventilated disk comprising:
   a pair of mutually opposing disk portions;
   a plurality of substantially radially extending ribs formed integral with said disk portions and interposed therebetween;
   a plurality of said ribs being formed to have at least one radially extending oblong hole penetrating the rib in a circumferential direction, said oblong holes defining at least one circular array along a circle whose center is the center of said disk portions; and
   at least one annular damping member extending throughout said oblong holes defining the said at least one circular array, said annular damping member being in intimate engagement with an outer end portion and side portions of each of said oblong holes, said ribs include two radially extending oblong holes belonging to a first circular array and a second circular array, respectively, along the radial direction of the disk penetrating the rib in a circumferential direction, said oblong holes defining said first and second circular arrays along circles whose centers are the center of said disk portions;
   two annular damping members extending through said oblong holes, respectively, said annular damping members being in contacting engagement with an outer end portion and side portions of said oblong holes.

3. The ventilated disk according to claim 1, wherein said oblong holes are elliptical in shape and said damping member has a circular cross section.

4. The ventilated disk according to claim 1, wherein said oblong holes are rectangular in shape, with a major axis of the rectangular shape being aligned radially of the disk portions, and said damping member is an annular, rectangularly shaped member.

5. A ventilated disk comprising:
   a pair of mutually opposing disk portions;
   a plurality of substantially radially extending ribs formed integral with said disk portions and interposed therebetween;
   a plurality of said ribs being formed to have at least one radially extending oblong hole penetrating the rib in a circumferential direction and defining at least one circular array, oblong holes of said ribs defining a circular array including oblong holes of a first class formed in any plurality of the ribs and oblong holes of a second class formed in the remaining ribs, each second class oblong hole being longer in the radial direction than each first class oblong hole and having an outer end portion situated radially outward of an outer end portion of each first class oblong hole; and
   at least one annular damping member extending through said oblong holes of first and second classes defining circular arrays, said annular damping member being in contacting engagement with an outer end portion and side portion of said first class oblong holes and with a side portion of said second class oblong holes.

6. The ventilated disk according to claim 5, wherein a plurality of said ribs are formed to include two of said first and second class oblong holes to define first and second circular arrays comprising the first and second class oblong holes; and
   two annular damping members being passed through each circular array of oblong holes, each of said annular damping members being in contacting engagement with an outer end portion and side portion of said first oblong holes and with a side portion of said second oblong holes of said annular array.

7. The ventilated disk according to claim 5, wherein at least said first oblong holes are elliptical in shape and said damping member has a circular cross section.

8. The ventilated disk according to claim 5, wherein at least of said first class oblong holes are rectangular in shape, with a major axis of the rectangular shape being aligned radially of the disk portion, and said damping member is an annular, rectangularly shaped member.

9. The ventilated disk according to claim 5, wherein said first class oblong holes are formed at positions symmetrical with respect to the center of the disk portion.

10. The ventilated disk according to claim 5, wherein a pair of the damping members is extends through the oblong holes defining the circular array.

11. A ventilated disk comprising:
    a disk;
    a plurality of substantially radially extending ribs formed integral with said disk;
    a plurality of holes for receiving at least one annular damping member provided in said disk in at least one circular array; and
    at least one annular damping member extending throughout the circular array of said holes in intimate contacting engagement with the inner walls of said hole but leaving a space for vibration in the holes, the damping member being embedded in said holes during casting of the disk.

12. The ventilated disk according to claim 1, wherein said annular damping member has been embedded within the circular array of oblong holes by casting the disk.

13. The ventilated disk according to claim 2, wherein said annular damping members have been embedded within the circular arrays of oblong holes by casting the disk.

14. The ventilated disk according to claim 1, wherein said annular damping member is a continuous ring formed of a solid body.

15. The ventilated disk according to claim 2, wherein said annular damping member is a continuous ring formed of a solid body.

16. The ventilated disk according to claim 11, wherein said annular damping member is a continuous ring formed of a solid body.

* * * * *